REFLECTANCE CURVE OF WHOLE HARVEST MASH OBTAINED WITH S. AUREOFACIENS STRAIN T-135 IN CORN STEEP MEDIUM

ΔR AT 420 mμ = 27
ΔR AT 430 mμ = 18

INVENTORS
JOHN ANDREW GROWICH, JR.
NICHOLAS DEDUCK
BY Edward A. Conroy, Jr.
ATTORNEY REFLECTANCE CURVE OF WHOLE HARVEST MASH OBTAINED WITH S. AUREOFACIENS STRAIN T-140 IN CORN STEEP MEDIUM ΔR AT 420 mμ = 32
ΔR AT 430 mμ = 18

INVENTORS
JOHN ANDREW GROWICH, JR.
NICHOLAS DEDUCK
BY Edward A. Conroy, Jr.
ATTORNEY REFLECTANCE CURVE OF WHOLE HARVEST MASH OBTAINED WITH S. AUREOFACIENS STRAIN T-143 IN CORN STEEP MEDIUM ΔR AT 420 mμ = 59
ΔR AT 430 mμ = -9

INVENTORS
JOHN ANDREW GROWICH, JR.
NICHOLAS DEDUCK
BY Edward A. Amroy, Jr.
ATTORNEY REFLECTANCE CURVE OF WHOLE HARVEST MASH OBTAINED WITH S. AUREOFACIENS STRAIN T-225 IN CORN STEEP MEDIUM ΔR AT 420 mμ = 72
ΔR AT 430 mμ = 3

INVENTORS
JOHN ANDREW GROWICH, JR.
NICHOLAS DEDUCK
BY Edward A. Conroy Jr.
ATTORNEY REFLECTANCE CURVE OF WHOLE HARVEST MASH OBTAINED WITH S. AUREOFACIENS STRAIN S-2308 IN CORN STEEP MEDIUM ΔR AT 420 mμ = 63

ΔR AT 430 mμ = 12

INVENTORS
JOHN ANDREW GROWICH, JR.
NICHOLAS DEDUCK
BY Edward A. Conroy Jr.
ATTORNEY REFLECTANCE CURVE OF WHOLE HARVEST MASH OBTAINED WITH S. AUREOFACIENS STRAIN S-2589 IN CORN STEEP MEDIUM ΔR AT 420 mμ = 94
ΔR AT 430 mμ = 36

INVENTORS
JOHN ANDREW GROWICH, JR.
NICHOLAS DEDUCK
BY Edward A. Conroy Jr.
ATTORNEY REFLECTANCE CURVE OF WHOLE HARVEST MASH OBTAINED WITH S. AUREOFACIENS STRAIN S-2589 IN SYNTHETIC MEDIUM ΔR AT 420 mμ = 118
ΔR AT 430 mμ = 87

INVENTORS
JOHN ANDREW GROWICH, JR.
NICHOLAS DEDUCK
BY Edward A. Conroy Jr
ATTORNEY REFLECTANCE CURVE OF WHOLE HARVEST MASH OBTAINED WITH S. AUREOFACIENS STRAIN S-2589 IN DRIED WHEY MEDIUM ΔR AT 420 mμ = 129
ΔR AT 430 mμ = 66

INVENTORS
JOHN ANDREW GROWICH, JR
NICHOLAS DEDUCK
BY Edward A. Auroy Jr.
ATTORNEY United States Patent Office Re. 25,840
Reissued Aug. 17, 1965

25,840

TETRACYCLINE FERMENTATION

John Andrew Growich, Jr., New City, N.Y., and Nicholas Deduck, Rahway, N.J., assignors to American Cyanamid Company, New York, N.Y., a corporation of Maine Original No. 3,092,556, dated June 4, 1963, Ser. No. 172,394, Feb. 12, 1962. Application for reissue June 9, 1964, Ser. No. 384,817

5 Claims. (Cl. 195—80)

Figure 1:
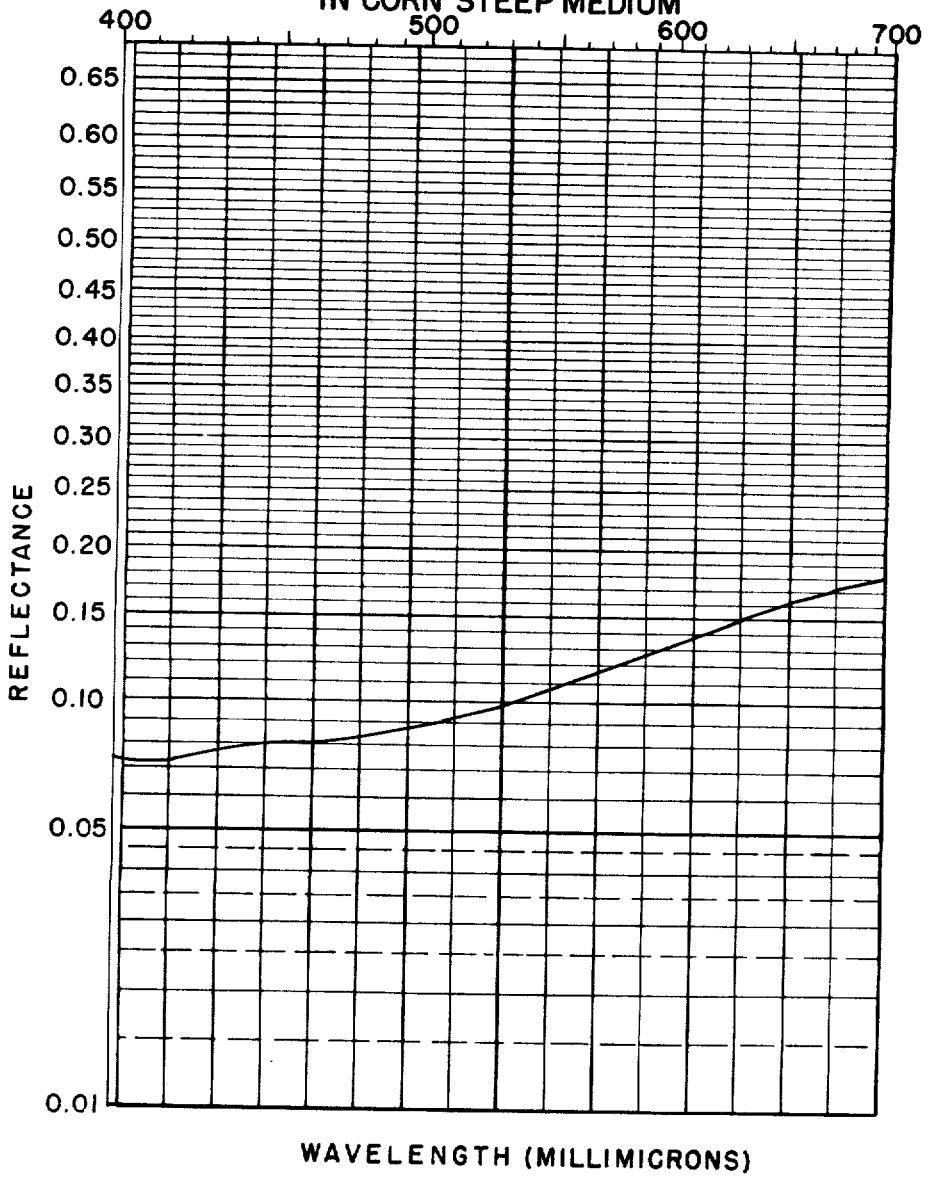

Matter enclosed in heavy brackets [ ] appears in the original patent but forms no part of this reissue specification; matter printed in italics indicates the additions made by reissue.

This invention relates to the production of tetracycline by fermentation and, more particularly, is concerned with certain novel mutant strains of Streptomyces aureofaciens which possess the property of producing tetracycline to the exclusion of chlortetracycline irrespective of the chloride ion content of the fermentation medium.

It has been known for some time that microorganisms of the species Streptomyces aureofaciens which produce tetracycline also simultaneously produce chlortetracycline. The concomitant production of chlortetracycline is objectionable when tetracycline is the principal product sought to be produced. Generally, while specification standards permit small quantities of chlortetracycline to be present in specification quality tetracycline, the presence of any sizable quantities of chlortetracycline is objectionable. Moreover, the presence of these two antibiotics in any sizable amounts in the fermentation mash involves difficult problems of separation in the refining or extraction procedures. It is possible, of course, to extract the antibiotics from the fermentation mash and by selective refining procedures to effect a separation of the antibiotics. However, the refining procedures for effecting separation of the antibiotics are not without some difficulty and they will usually involve some loss in total antibiotic potency. Moreover, chlortetracycline, which in those instances where tetracycline is the principal product of the fermentation, may be considered a contaminant and is customarily discarded since it is usually not present in sufficient quantity to warrant the expense of a separate purification procedure to bring it up to specification standards. Heretofore, chloride ion deprivation or the use of chlorination inhibitors have been means available for suppressing the formation of chlortetracycline.

The present invention is based upon the discovery that certain novel mutant strains of Streptomyces aureofaciens produce tetracycline, to the total exclusion of chlortetracycline, by fermentation. These novel mutant strains of Streptomyces aureofaciens are, in essence, chloride ion-ignoring strains in that they produce tetracycline exclusively regardless of the concentration of chloride ion in the medium.

The novel mutant strains of the present invention are strains of the species S. aureofaciens. *The S. aureofaciens strains described below* [since they] are all direct descendents of the chlortetracycline-producing S. aureofaciens A–337 soil isolate described in U.S. Patent No. 2,482,055 to Duggar, and deposited at the Northern Regional Research Laboratories, Peoria, Illinois, and indexed as NRRL–2209. Derivation of these novel mutant strains of S. aureofaciens from the original A–337 strain involved treatment of the A–337 strain with mutagenic agents including ultraviolet irradiation, nicotine, and nitrogen mustard. Typical mutant strains of S. aureofaciens which possess the unique property of ignoring chloride ion have been designated by us as T–135, T–140, T–143, T–225, S–2308, and S–2589. Viable cultures representative of these novel mutant strains have been deposited with the American Type Culture Collection (ATCC) in Washington, D.C., and have been assigned the following accession numbers.

| Strain: | ATCC No. |
|---|---|
| T–135 | 13,908 |
| T–140 | 13,909 |
| T–143 | 13,910 |
| T–225 | 13,911 |

In general, the novel mutant strains of the present invention are characteristic of the species S. aureofaciens but differ from previously described strains of S. aureofaciens, not only in pigmentation, but also in the colors of the whole harvest mashes obtained therewith. The colors of the whole harvest mashes obtained by fermentation with the novel mutant strains of the present invention all exhibit a value of $\Delta R$ at 420 m$\mu$ which is greater than the value of $\Delta R$ at 430 m$\mu$.

Figure 2:
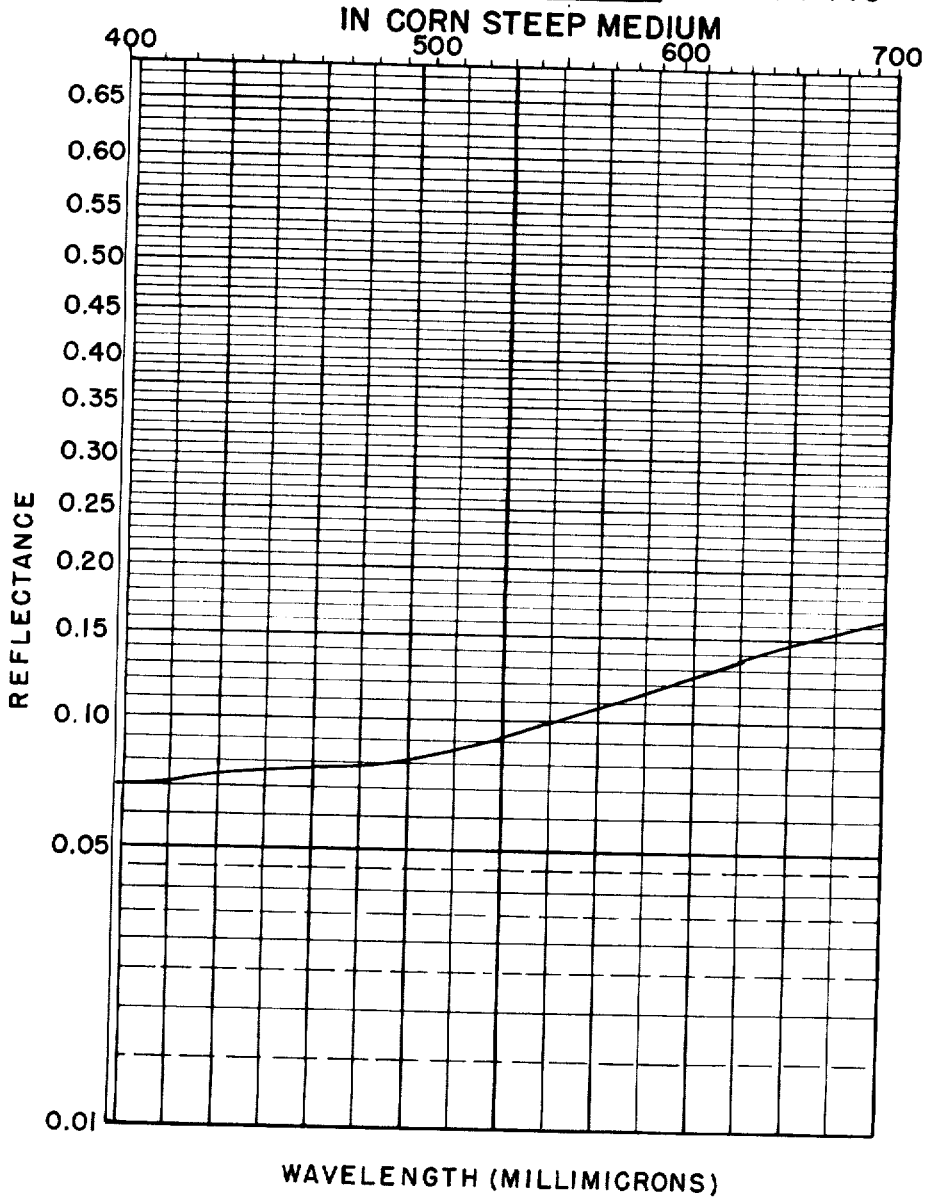
Figure 3:
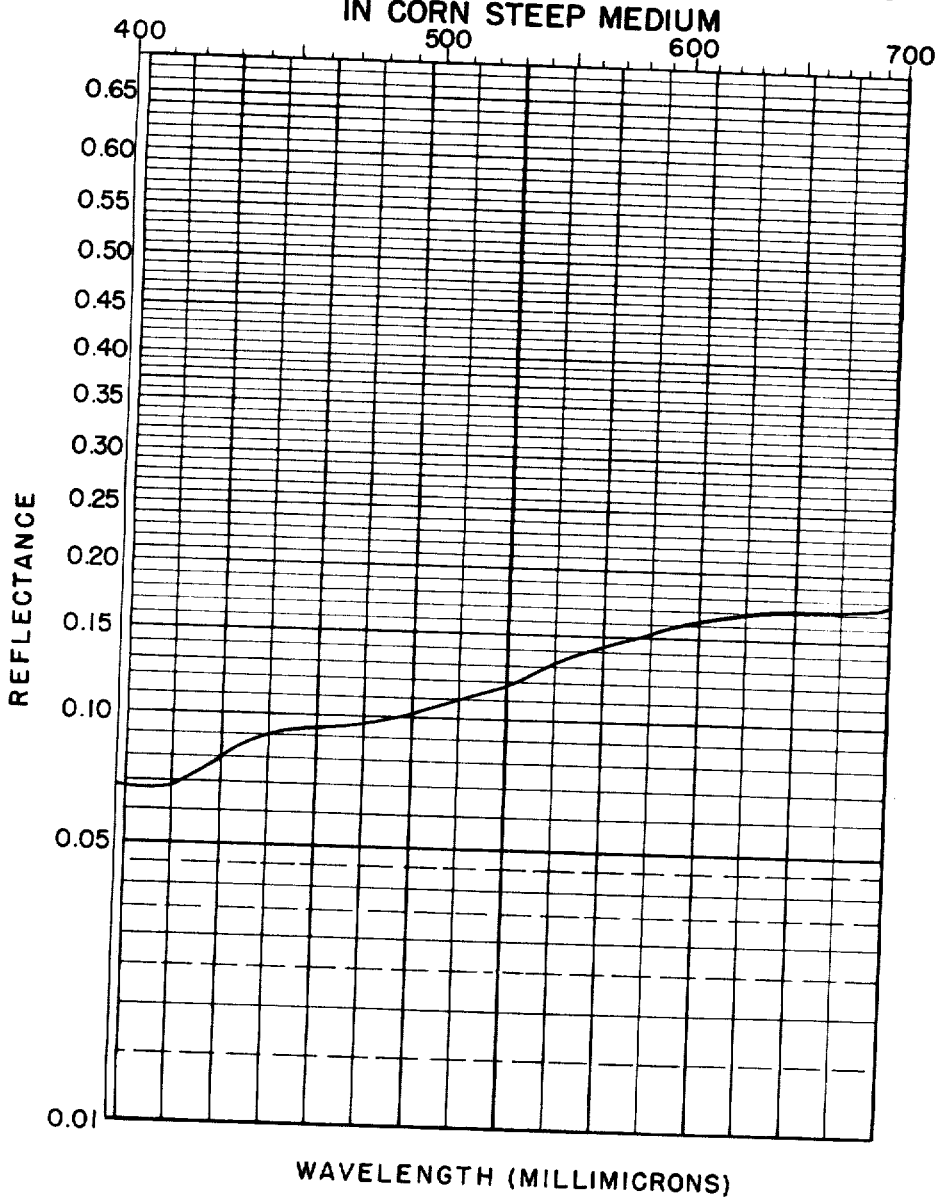
Figure 4:
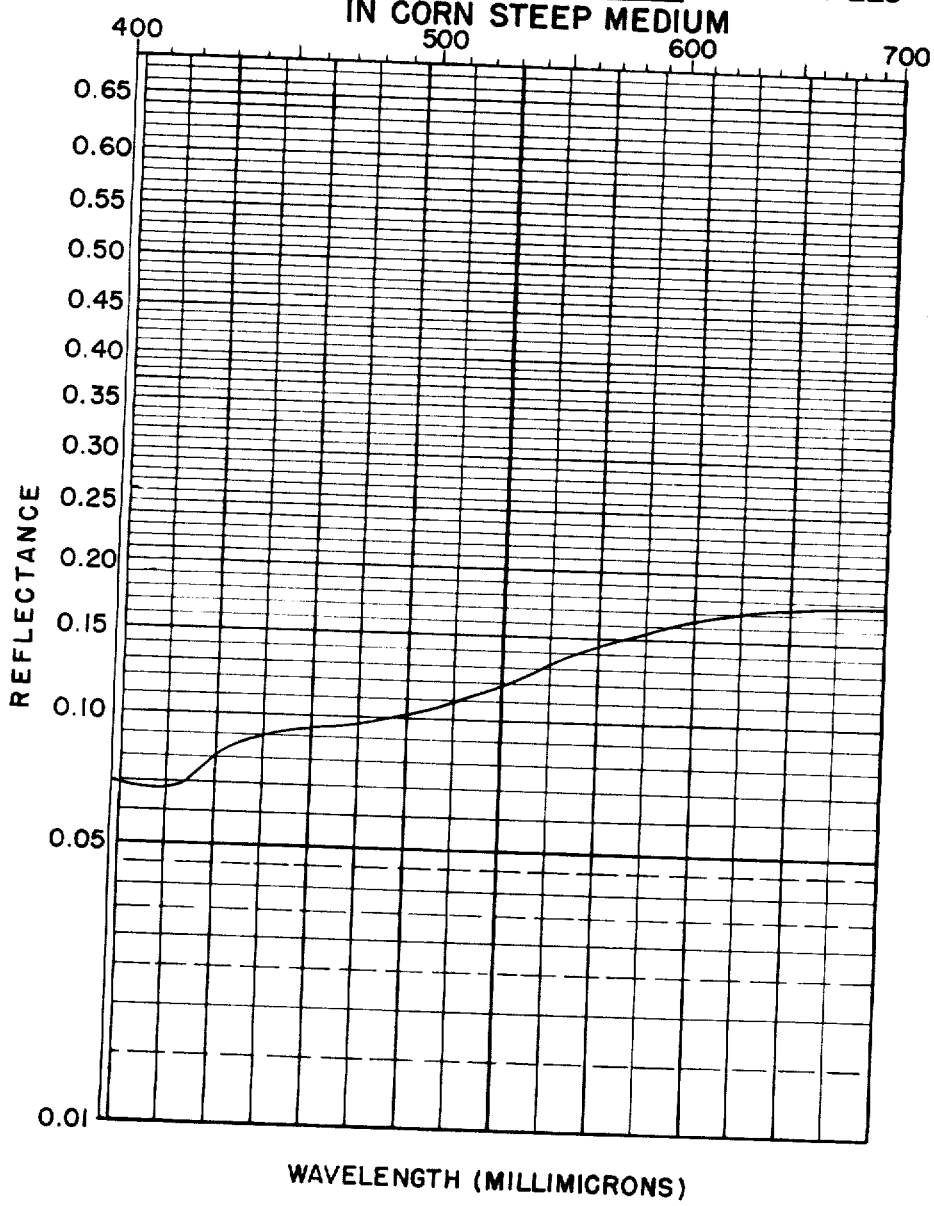
Figure 5:
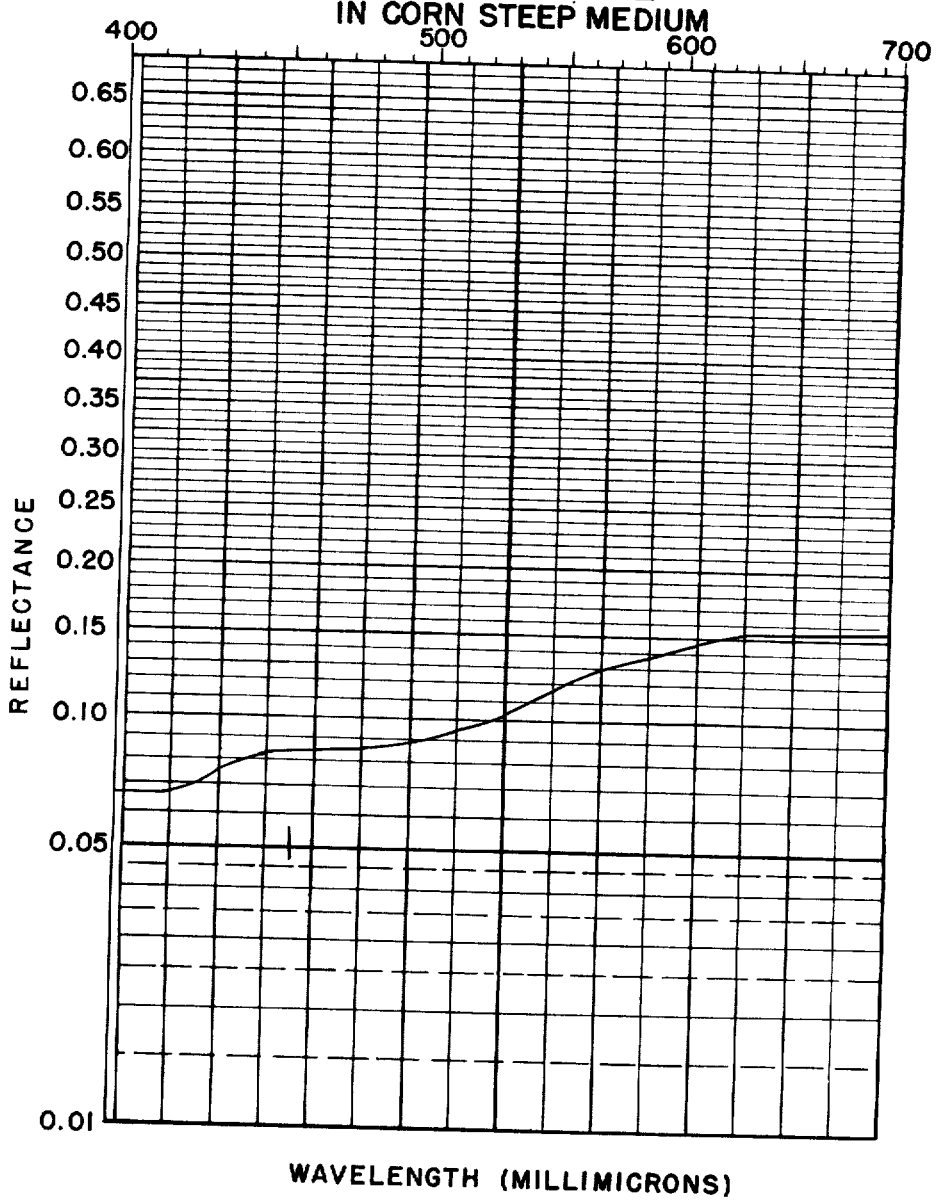
Figure 6:
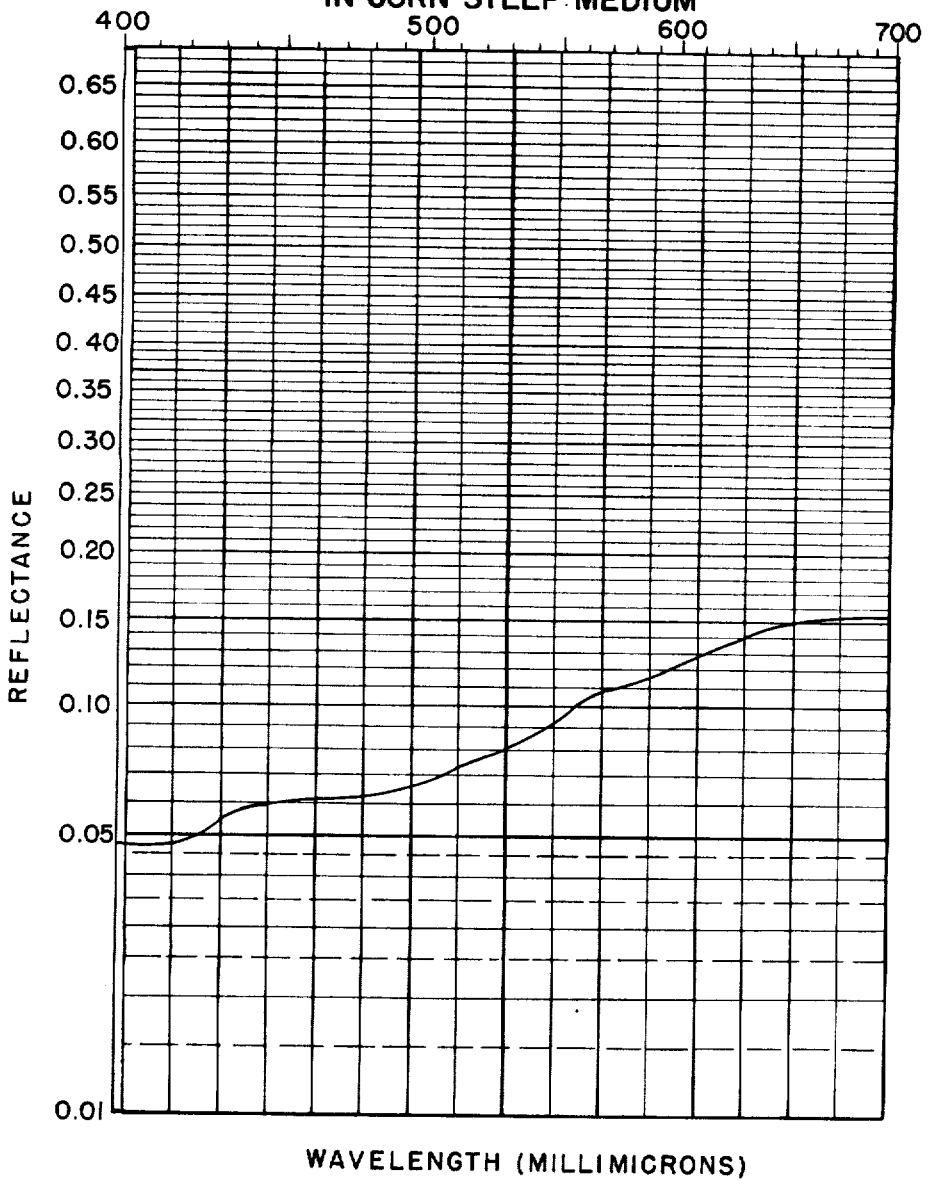
Figure 7:
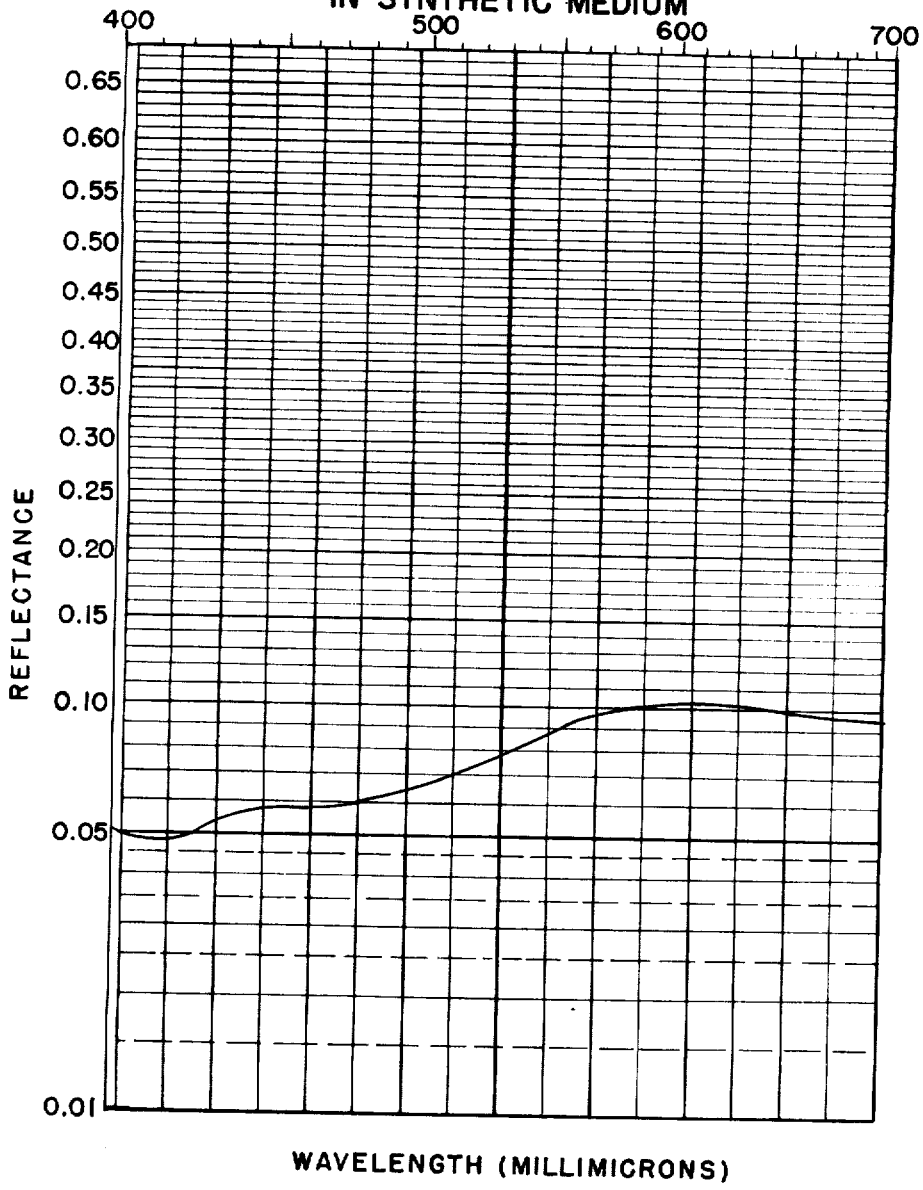
Figure 8:
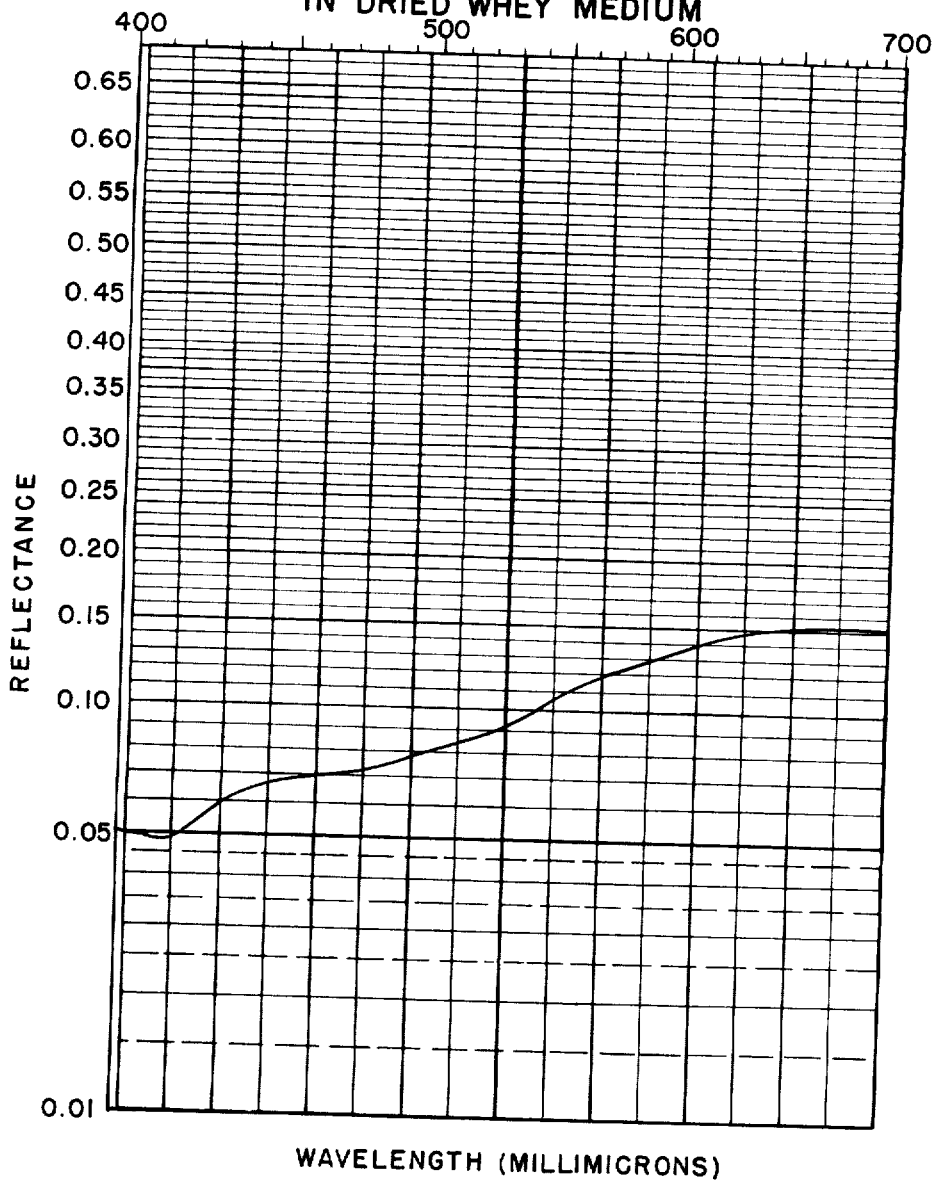

FIGURES 1 through 8 of the drawings are spectrophotometric reflectance curves of one-centimeter glass cells filled with the whole harvest mashes obtained with the novel mutant strains of S. aureofaciens of the present invention. The spectrophotometric reflectance curve of a material constitutes a permanent record that does not require the maintenance of a sample. Furthermore, the units in which the curve is expressed are understood and accepted in every civilized country. In FIGURES 1 through 8, the wavelength of light in millimicrons is plotted as the abscissa against the reflectance as the ordinate. The wavelength of light has been adopted internationally as the fundamental standard of length to which all other standards of length are referred. These spectrophotometric reflectance curves were determined with a standard spectrophotometer using magnesium carbonate as a reference.

The letter R denotes the reflectance value at some particular wavelength, for example, $R_{500}$ is the reflectance value at a wavelength of 500 m$\mu$. The symbol $\Delta R$ denotes the vertical distance between the reflectance curve (when both percent reflectance and wavelength are plotted on linear scales) and a straight line drawn through the reflectance curve intercepts at 400 m$\mu$ and 550 m$\mu$. This graphical determination of the values of $\Delta R$ at 420 m$\mu$ and at 430 m$\mu$ may be readily carried out and in every case the novel mutant strains of the present invention impart a color to the whole harvest mashes such that $\Delta R$ at 420 m$\mu$ is greater that $\Delta R$ at 430 m$\mu$.

The mathematical determination of the values of $\Delta R$ at 420 m$\mu$ and at 430 m$\mu$ may also be accomplished by means of the following equations:

$$\Delta R \text{ at } 420\ m\mu = 20(R_{550}) + 130(R_{400}) - 150(R_{420})$$
$$\Delta R \text{ at } 430\ m\mu = 30(R_{550}) + 120(R_{400}) - 150(R_{430})$$

wherein $R_{400}$, $R_{420}$, $R_{430}$ and $R_{550}$ are the reflectance values at wavelengths at 400 mμ, 420 mμ, 430 mμ, and 550 mμ, respectively. This mathematical determination is not dependent upon the scale used for either percent reflectance or wavelength.

A "whole harvest mash" is the untreated mash obtained after the fermentation has proceeded to the point where biosynthesis of the primary product has stopped for all practical purposes. Generally, the antibiotic potency of the fermentation mash ceases to rise appreciably after the fermentation has proceeded for from about 140 to about 160 hours.

To illustrate the visual color variations among the novel mutant strains of S. aureofaciens which produce tetracycline exclusively, these strains were grown on cornsteep agar and the following observations were made.

COLOR OBSERVATIONS:[1] S. AUREOFACIENS: AP4 CORN STEEP AGAR: SIX DAY INCUBATION AT 26.5° C.

| Strain | Single colonies | Mass growth |
|---|---|---|
| T-135 | Dark luggage tan | Maple. |
| T-140 | Orange rust | Do. |
| T-143 | Oak brown | Light brown. |
| T-225 | Dark luggage tan | Yellow maple. |

[1] Colors according to the Color Harmony Manual, Third Edition, Container Corporation of America.

COLOR OBSERVATIONS:[1] S. AUREOFACIENS: AP6 CORNSTEEP AGAR: SIX DAY INCUBATION AT 26.5° C.

| Strain | Single colonies | Mass growth |
|---|---|---|
| T-135 | Luggage tan | Light spice brown. |
| T-140 | Orange rust | Maple. |
| T-143 | Dark luggage tan | Do. |
| T-225 | Luggage tan | Do. |

[1] Colors according to the Color Harmony Manual, Third Edition, Container Corporation of America.

FORMULATION OF AP4 AGAR

| | | |
|---|---|---|
| Sucrose | grams | 10 |
| $MgSO_4 \cdot 7H_2O$ | do | 0.25 |
| $KH_2PO_4$ | do | 2 |
| $(NH_4)_3PO_4$ | do | 2 |
| Cornsteep | do | 4 |
| Bacto agar | do | 20 |
| Water, q.s. | milliliters | 1,000 |

FORMULATION OF AP6 AGAR

Same as AP4 agar, except cornsteep level is 6 grams per liter.

The novel mutant strains of S. aureofaciens of the present invention which produce tetracycline exclusively possess the same general characteristics as do the strains which produce both chlortetracycline and tetracycline, and differ among themselves in the same general manner that the tetracycline-producing and chlortetracycline-producing strains differ from each other as has been described in a number of scientific papers which have been published. The data appearing below will serve to further distinguish the novel mutant strains of S. aureofaciens of the present invention from previously known strains of S. aureofaciens such as the original A-377 strain available as NRRL-2209.

The novel Streptomyces aureofaciens mutant strains were differentiated from S. aureofaciens A-377 (NRRL-2209) by observation of growth characteristics on various media incubated at 26.5° C.

(1) GLYCEROL ASPARAGINE BEEF EXTRACT AGAR

| | | |
|---|---|---|
| Glycerol | percent | 1.0 |
| L-asparagine | do | 0.05 |
| Beef extract | do | 0.2 |
| $KH_2PO_4$ | do | 0.05 |
| Bacto agar | do | 1.5 |
| Distilled water, q.s. | do | 100.0 |
| pH adjustment with 50% KOH | | 7.0 |
| Post sterilization pH | | 7.2 |

| | Streptomyces aureofaciens | |
|---|---|---|
| | Strain T-135 | Strain T-140 |
| Growth | Good, hyaline; apigmentous to topaz.[1] | Good, hyaline; apigmentous to topaz.[1] |
| Aerial hyphae | Slight becoming moderate; white. | Slight becoming moderate; white. |
| Sporulation | None | None. |
| Diffusible pigment. | do | Do. |
| Reverse | Hyaline; topza becoming oak brown. | Hyaline; topaz becoming oak brown. |
| | Strain T-143 | Strain T-225 |
| Growth | Good, hyaline; dark luggage tan.[1] | Excellent. |
| Aerial hyphae | Sparse to fair; white becoming silver gray. | Abundant to profuse; white becoming light fawn[1] to beaver. |
| Sporulation | Fair | Profuse. |
| Diffusible pigment. | Light amber | Yellow. |
| Reverse | Hyaline; deep brown | Dark brown mahogany. |
| | Strain A-377 | |
| Growth | Good | |
| Aerial hyphae | Slight to fair; white to light gray.[1] | |
| Sporulation | Fair | |
| Diffusable pigment. | Light yellow | |
| Reverse | Yellow to light orange-yellow. | |

[1] Colors according to the Color Harmony Manual, Third Edition, Container Corporation of America.

(2) DEXTRIN CZAPEK-DOX AGAR

| | | |
|---|---|---|
| Dextrin | percent | 1.0 |
| $NaNO_3$ | do | 0.2 |
| $K_2HOP_4$ | do | 0.1 |
| $MgSO_4.7H_2O$ | do | 0.05 |
| KCl | do | 0.05 |
| $FeSO_4.7H_2O$ | do | 0.001 |
| Bacto agar | do | 1.5 |
| Distilled water, q.s. | do | 100.0 |
| Post sterilization pH | | 7.2 |

| | Streptomyces aureofaciens | |
|---|---|---|
| | Strain T-135 | Strain T-140 |
| Growth | Slight, thin, semitranslucent; white.[1] | Slight, thin, semitranslucent; white.[1] |
| Aerial hyphae | Slight; white | None. |
| Sporulation | None | Do. |
| Diffusible pigment. | do | Do. |
| Reverse | White, translucent | White, translucent. |
| | Strain T-143 | Strain T-225 |
| Growth | Slight, thin semitranslucent; white.[1] | Slight, thin, semi-opaque white.[1] |
| Aerial hyphae | Slight; white | Slight, white. |
| Sporulation | None | None. |
| Diffusible pigment. | do | Do. |
| Reverse | White; translucent | White; translucent. |
| | Strain A-377 | |
| Growth | Good | |
| Aerial hyphae | Abundant, mouse gray[1] to lead gray; water-white surface globules. | |
| Sporulation | Profuse | |
| Diffusible pigment. | Trace; pale yellow | |
| Reverse | Apigmentous; pink trace | |

[1] Colors according to the Color Harmony Manual,, Third Edition, Container Corporation of America.

(3) AP4 CORNSTEEP AGAR

| | | |
|---|---|---|
| Cornsteep | percent | 0.4 |
| Sucrose | do | 1.0 |
| $MgSO_4 \cdot 7H_2O$ | do | 0.025 |
| $KH_2PO_4$ | do | 0.2 |
| $(NH_4)_2HPO_4$ | do | 0.2 |
| Bacto agar | do | 2.0 |
| Tap water, q.s. | do | 100.0 |
| Post sterilization pH | do | 6.5 |

| | Streptomyces aureofacines | |
|---|---|---|
| | Strain T-135 | Strain T-140 |
| Growth | Moderate | Moderate. |
| Aeriel hyphae | Scarce becoming abundant; beaver.[1] | Moderate; beaver [1] to chocolate. |
| Sporulation | Moderate to abundant | Moderate. |
| Soluble pigment | Orange-brown | Orange-brown. |
| Reverse | Light brown to chocolate brown. | Chestnut brown to deep brown. |
| | Strain T-143 | Strain T-225 |
| Growth | Abundant | Abundant. |
| Aerial hyphae | Abundant; fawn [1] to beaver. | Profuse; chocolate.[1] |
| Sporulation | Moderate to abundant | Profuse. |
| Soluble pigment | Light orange-brown | Light orange-brown. |
| Reverse | Deep brown to dark brown. | Dark rose brown to ebony brown. |
| | Strain A-377 | |
| Growth | Excellent | |
| Aerial hyphae | Abundant; fawn [1] | |
| Sporulation | Profuse | |
| Soluble pigment | Light yellow to amber | |
| Reverse | Light tan | |

[1] Colors according to the Color Harmony Manual, Third Edition, Container Corporation of America.

(4) AP6 CORNSTEEP AGAR

| | | |
|---|---|---|
| Cornsteep | grams | 6 |
| Sucrose | do | 10 |
| $MgSO_4 \cdot 7H_2O$ | do | 0.25 |
| $KH_2PO_4$ | do | 2 |
| $(NH_4)_2HPO_4$ | do | 2 |
| Bacto agar | do | 20 |
| Tap water, q.s. | ml | 1,000 |
| Post sterilization pH | | 6.5 |

| | Streptomyces aureofaciens | |
|---|---|---|
| | Strain T-135 | Strain T-140 |
| Growth | Abundant | Abundant. |
| Aerial hyphae | Moderate to abundant; fawn [1] to mist brown. | Moderate to abundant; beaver [1] to fawn. |
| Sporulation | Moderate to abundant | Profuse. |
| Soluble pigment | Orange to orange-brown | Orange to orange-brown. |
| Reverse | Chestnut brown to deep brown. | Chestnut brown to deep brown. |
| | Strain T-143 | Strain T-225 |
| Growth | Abundant | Abundant. |
| Aerial hyphae | Slight to moderate; beige [1] to mist brown. | Profuse; chocolate.[1] |
| Sporulation | Fair | Profuse. |
| Soluble pigment | Orange-brown | Orange-brown. |
| Reverse | Chocolate brown | Ebony brown. |
| | Strain A-377 | |
| Growth | Excellent | |
| Aerial hyphae | Moderate to abundant; fawn.[1] | |
| Sporulation | Profuse | |
| Soluble pigment | Orange-brown | |
| Reverse | Orange to orange-yellow | |

[1] Colors according to the Color Harmony Manual, Third Edition, Container Corporation of America.

(5) Q4 CORNSTEEP AGAR

| | | |
|---|---|---|
| Cornsteep | grams | 9 |
| Sucrose | do | 10 |
| $MgSO_4 \cdot 7H_2O$ | do | 0.25 |
| $(NH_4)_2HPO_4$ | do | 2 |
| Crude agar | do | 30 |
| Water, q.s. | do | 1,000 |
| Post sterilization pH | ml | 6.5 |

| | Streptomyces aureofaciens | |
|---|---|---|
| | Strain T-135 | Strain T-140 |
| Growth | Abundant | Profuse. |
| Aerial hyphae | Abundant; fawn [1] to beaver. | Profuse; fawn [1] to beaver. |
| Sporulation | Abundant | Abundant. |
| Soluble pigment | Deep orange-brown | Deep orange-brown. |
| Reverse | Copper brown to deep brown. | Copper brown to deep brown. |
| | Strain T-143 | Strain T-225 |
| Growth | Profuse | Profuse. |
| Aerial hyphae | Profuse; beige [1] to mist brown. | Profuse; chocolate.[1] |
| Sporulation | Profuse | Profuse. |
| Soluble pigment | Deep orange-brown | Deep amber. |
| Reverse | Deep brown to chocolate brown. | Ebony brown. |
| | Strain A-377 | |
| Growth | Excellent; pale yellow [1] | |
| Aerial hyphae | Profuse; dark brown | |
| Sporulation | Profuse | |
| Soluble pigment | Orange-brown | |
| Reverse | Orange to orange-yellow | |

[1] Colors according to the Color Harmony Manual, Third Edition, Container Corporation of America.

(6) OTHER AGAR MEDIA

| Medium | Streptomyces aureofaciens | |
|---|---|---|
| | Strain T-135 | Strain T-140 |
| Nutrient agar | Poor to fair growth; white to pale yellow.[1] No aerial hyphae. Reverse: white to pale yellow. | Poor growth; white to pale yellow.[1] No aerial hyphae. Reverse: white to pale yellow. |
| Glucose Asparagine Meat extract Agar. | Good growth; hyaline, apigmentous to pale orange.[1] No aerial hyphae. Reverse: apigmentous to pale orange. | Good growth; hyaline, apigmentous to pale orange.[1] Slight aerial hyphae formation; white. Reverse: apigmentous to pale orange. |
| Waksman's agar. | Good growth, semi-opaque; white to pale orange.[1] Aerial hyphae: sparse becoming abundant; white to fawn. Sporulation: spars becoming abundant. Reverse: dark luggage tan to dark spice brown. Light amber soluble pigment. | Good growth, semi-opaque; white to pale orange [1] becoming orange with age. Aerial hyphae: sparse becoming abundant; white to beaver. Sporulation: sparse becoming profuse. Reverse: beige to copper brown. Trace of light amber soluble pigment. |
| Purple milk | Pale yellow [1] growth collar. Partial peptonization, pH 7.1. | Pale yellow growth collar.[1] Partial peptonization, pH 7.0. |
| Potato slants | Profuse, moist, nodulated growth; chestnut brown [1] to dark spice brown. Rust brown soluble pigment. | Profuse, moist, nodulated growth; light spice brown.[1] Barn red soluble pigment. Slight white aerial hyphae formation. |

[1] Colors according to the Color Harmony Manual, Third Edition, Container Corporation of America.

| Medium | Streptomyces aureofaciens | |
|---|---|---|
| | Strain T-143 | Strain T-225 |
| Nutrient agar | Poor growth: white to light orange-yellow.[1] No aerial hyphae. Reverse: white to light orange-yellow. | Poor to fair growth: white to golden brown.[1] No aerial hyphae. Reverse: translucent, white to adobe brown. No soluble pigment. |
| Glusoce asparagine meat extract agar. | Good growth: hyaline, pale yellow to orange.[1] Aerial hyphae: slight, white. Reverse: hyaline; pale yellow to copper brown to deep brown | Abundant growth. Profuse aerial hyphae; beaver.[1] Sporulation: profuse. Reverse: dark eggplant. Very light amber soluble pigment. |
| Waksman's agar. | Good growth; light tan to topaz.[1] Aerial hyphae: fair to abundant, beige brown to fawn. Sporulation: poor becoming profuse. Reverse: dark luggage tan to deep brown. Light amber to amber soluble pigment. | Abundant growth. Abundant aerial hyphae; taupe brown [1] to chocolate. Reverse: ebony. Light amber soluble pigment. |
| Potato slants | Profuse, moist, nodulated growth; beaver [1] to light spice brown. Dense white aerial hyphae at isolated foci. Rust brown soluble pigment. | Profuse, moist, smooth nodulated growth; orange rust [1] to oak brown becoming chocolate with age. Orange brown soluble pigment. |
| Purple milk | Pale yellow [1] growth collar. Little significant pH change or apparent peptonization, pH 6.7. | Heavy pale yellow [1] growth collar. Partial peptonization, pH 6.78. No soluble pigment. |

[1] Colors according to the Color Harmony Manual, Third Edition, Container Corporation of America.

| Medium | Streptomyces aureofaciens |
|---|---|
| | Strain A-377 |
| Nutrient agar | Good growth. No aerial hyphae. Pale yellow soluble pigment. Reverse: pale yellow. |
| Glucose asparagine meat extract agar. | Good growth. Aerial hyphae white becoming increasingly gray [1] with increase in spore formation. Trace: yellow-orange soluble pigment. Reverse: light yellow to pink-orange. |
| Waksman's agar | Good growth. Aerial hyphae fair becoming abundant: white to taupe brown.[1] Light yellow soluble pigment. Reverse: camel to adobe brown. |
| Potato slants | Profuse, moist, smooth, nodulated growth; light brown-yellow [1] to beige to cedar. No soluble pigment. |
| Purple milk | Slight yellow [1] to pale yellow growth collar. Little significant pH change or apparent peptonization in 14 days. pH 6.45. |

[1] Colors according to the Color Harmony Manual, Third Edition Container Corporation of America.

(7) MICROSCOPIC OBSERVATIONS

| Medium | Streptomyces aureofaciens | | | |
|---|---|---|---|---|
| | Strain T-135 | | Strain T-140 | |
| | Mycelium | Spores | Mycelium | Spores |
| AP4 cornsteep agar. | Flexuous, continuous, branched. Diam. 0.8 to 1.0μ | Spheroidal to ovoidal. Diam. 0.8 to 1.5μ | Flexuous, continuous, branched. Diam. 0.8 to 1.0 μ. | Spheroidal to ovoidal. Diam. 0.8 to 1.5μ. |
| Q4 agar | Flexuous, continuous, branched. Diam. 0.8 to 1.0μ. | Spheroidal to ovoidal. Diam. 1.0 to 1.2μ. | Flexuous, continuous, branched. Diam. 0.8 to 1.0μ. | Spheroidal to ovoidal. Diam. 1.0 to 1.2μ. |
| Waksman's agar. | Flexuous, continuous, branched. Diam. 0.8 to 1.0μ. | Spheroidal to ovoidal. Diam. 1.2 to 1.5μ. | Flexuous, continuous, branched. Diam. 0.8 to 1.0μ. | Spheroidal to ovoidal. Diam. 1.0 to 1.2μ. |

| Medium | Streptomyces aureofaciens | | | |
|---|---|---|---|---|
| | Strain T-143 | | Strain T-225 | |
| | Mycelium | Spores | Mycelium | Spores |
| Glycerol asparagine meat extract agar. | Flexuous, continuous, branched. Diam. 0.8 to 1.0μ. | Spheroidal to ovoidal. Diam. 1.0 to 1.2μ. | Flexuous, continuous, branched. Diam. 0.8 to 1.0μ. | Spheroidal to ovoidal. Diam. 1.2 to 1.5μ. |
| AP4 cornsteep agar. | Flexuous, continuous, branched. Diam. 0.8 to 1.2μ. | Spheroidal to ovoidal. Diam. 0.8 to 1.5μ. | Flexuous, continuous, branched. Diam. 0.8 to 1.0μ. | Spheroidal to ovoidal. Diam. 1.0 to 1.2μ. |

| Medium | Streptomyces aureofaciens | |
|---|---|---|
| | Strain A-377 | |
| | Mycelium | Spores |
| Glycerol asparagine meat extract agar. | Flexuous, continuous, branched. Diam. 0.8 to 1.0μ. | Spheroidal to ovoidal. Diam. 1.0 to 1.5μ. |
| AP4 cornsteep agar | Flexuous, continuous, branched. Diam. 1.0 to 1.2μ. | Spheroidal to ovoidal. Diam. 1.2 to 1.5μ. |

The conditions of the fermentation are generally the same as for the presently known methods of producing chlortetracycline by fermentation. That is, the fermentation medium contains the usual nutrients and minerals substances. Suitable nutrient substances include starch, dextrose, cane sugar, glucose, molasses, soybean meal, milk solids, yeast, meat extracts, peptone, urea, cornsteep liquor, distillers' solubles, fish meal and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation such as hydrogen ion concentration, temperature, time, rate of aeration, preparation of the inoculum, sterilization inoculation and the like are conventional and may be similar to those for the production of chlortetracycline shown in U.S. Patent No. 2,482,055 to Duggar.

The recovery of the tetracycline from the fermentation liquor is conventional and need not be described as numerous methods for recovering tetracycline from fermentation liquors have already been published.

The invention will be described in greater detail in conjunction with the following specific examples.

EXAMPLE 1

Inoculum preparation of S. aureofaciens strain T-135

Spores of S. aureofaciens strain T-135 were washed from a streaked agar slant with sterile distilled water to form a suspension containing $60\text{–}80\times10_6$ spores/ml. A 0.33-ml. portion of this suspension was used to inoculate an eight-inch shaker tube containing 8 ml. of medium prepared according to the following formulation:

| | | |
|---|---|---|
| Sucrose | grams | 30 |
| Ammonium sulfate | do | 2 |
| Calcium carbonate | do | 7 |
| Cornsteep | ml | 16.5 |
| Tap water, q.s | ml | 1,000 |

Prior to inoculation, the medium was sterilized by autoclaving for 20 minutes under a pressure of 15 pounds per square inch, during which the pH changed from 6.3 to 6.9. The inoculated shaker tube was then incubated for 24 hours at 28° C. on a reciprocating shaker operating at 116 oscillations per minute. Inocula of the other novel mutant strains of the present invention are prepared in an identical fashion.

EXAMPLE 2

Chloramine-T test for tetracycline-chlortetracycline differentiation

Stock solution A was prepared by dissolving 100 grams of Chloramine-T in 900 ml. of 0.1 M $Na_3PO_4$ (38 grams of $Na_3PO_4 \cdot 12H_2O$ per 1,000 ml. of distilled water). A working solution B was prepared by mixing 180 ml. of stock solution A with 820 ml. of an aqueous solution of ethylenediaminetetraacetic acid sodium salt (3 grams per 1,000 ml. of distilled water). In performing the actual test, 0.5 ml. of the fermentation mash to be tested is mixed in a test tube with 20 ml. of working solution B. The tube is shaken intermittently for a period varying from 30 to 60 minutes. At the termination of this period of shaking, the test tube is examined for color. Mashes containing high concentrations of tetracycline turn wine red (a positive reaction), while mashes containing high concentrations of chlortetracycline develop a deep amber color. This Chloramine-T test is a further means of differentiating the novel mutant strains of the present invention from previously known strains of S. aureofaciens.

EXAMPLE 3

Silver nitrate test for chloride ion

To a 10-ml. portion of whole fermentation mash, there is added 10 ml. of 0.2 M $HNO_3$ and 0.5 gram of chloride free, diatomaceous earth filter aid. The combined materials and mixed thoroughly and then filtered. The filtrate thus obtained is re-filtered as often as necessary to obtain a clear filtrate. A 2-ml. portion of 0.01 M $AgNO_3$ is next added to a 2-ml. aliquot of the clear filtrate in a test tube. The mixture is observed for a period of 1 minute. The formation of AgCl, evidenced either as turbidity or as a white precipitate, indicates the presence of free unbound chloride ion in the whole mash samples.

EXAMPLE 4

Tetracycline production in shaker flask fermentations

A. FULL CHLORIDE MEDIUM

A full chloride fermentation medium for tetracycline production was prepared as follows:

| | | |
|---|---|---|
| $(NH_4)_2SO_4$ | grams | 5 |
| $CaCO_3$ | do | 7–9 |
| $NH_4CL$ | do | 1.5 |
| $FeSo_4 \cdot 7H_2O$ | do | 0.4–0.6 |
| $MnSO_4 \cdot 4H_2O$ | do | 0.05 |
| $ZnSO_4 \cdot 7H_2O$ | do | 0.1 |
| Cornsteep liquor | do | 20–30 |
| Cottonseed meal | do | 0–2 |
| Starch | do | 55 |
| Lard oil | ml | 20 |
| Tap water, q.s | ml | 1,000 |

B. CHLORIDE-LIMITED MEDIUM

A chloride-limited fermentation medium for tetracyline production was prepared as follows:

| | | |
|---|---|---|
| $(NH_4)_2SO_4$ | grams | 6.83 |
| $CaCO_3$ | do | 7–9 |
| $FeSO_4 \cdot 7H_2O$ | do | 0.4–0.6 |
| $MnSO_4 \cdot 4H_2O$ | do | 0.05 |
| $ZnSO_4 \cdot 7H_2O$ | do | 0.1 |
| Cornsteep liquor | do | 20–30 |
| Cottonseed meal | do | 0–2 |
| Starch | do | 55 |
| Lard oil | ml | 20 |
| Tap water, q.s | ml | 1,000 |

Five 25-ml. aliquots of both media were placed in ten 250-ml. Erlenmeyer flasks, sealed in each case with a cotton plug, and sterilized in an autoclave for 20 minutes at a pressure of 15 pounds per square inch. After sterilization, each pair of 25-ml. aliquots were variously inoculated with 1.0 ml. of inocula prepared as in Example 1. The fermentation was carried out at 28° C. from 0 to 18 hours and then at 24° C. from 18 to 142 hours, at pH 6–7, on a rotary shaker operating at 180 revolutions per minute. Under these conditions, the results set forth in Table I below were obtained.

TABLE I

| Strain No. | Medium | Assays | | Chloramine-T test [1] | Silver nitrate test [2] |
|---|---|---|---|---|---|
| | | Chlortetracycline, mcg./ml. | Tetracycline, mcg./ml. | | |
| T-135 | A | [3] <50 | 2,460 | + | + |
| | B | <50 | 2,510 | + | + |
| T-140 | A | <50 | 2,210 | + | + |
| | B | <50 | 2,200 | + | + |
| T-143 | A | <50 | 3,820 | + | + |
| | B | <50 | 3,470 | + | + |
| T-225 | A | <50 | 3,890 | + | + |
| | B | <50 | 3,990 | + | + |
| S-2308 | A | <50 | 6,580 | + | + |
| | B | <50 | 6,520 | + | + |

[1] Chloramine-T test as per Example 2.
[2] Silver nitrate test as per Example 3.
[3] The chlortetracyline assay method is not sensitive to less than 50 mcg./ml. However, the cultures showed no chlortetracycline by paper strip chromatography.

EXAMPLE 5

Tetracycline production in shaker flask fermentations—effect of ammonium chloride concentration Fermentation medium A of Example 4 was prepared with levels of 0.0 0.2, 0.5, and 1.5 g./l. of $NH_4Cl$ and a constant 5.0 g./1. level of $(NH_4)_2SO_4$. Fermentation was carried out as described in Example 4, with the results set forth in Table II below.

TABLE II

| Strain No. | $NH_4Cl$ level, g./l. | Assays | | Silver nitrate test [1] |
|---|---|---|---|---|
| | | Chlortetracycline, mcg./ml. | Tetracycline, mcg./ml. | |
| T-225 | 0.0 | [3] <50 | 3,430 | ± |
| | 0.1 | <50 | 2,770 | + |
| | 0.2 | <50 | 2,900 | + |
| | 0.5 | <50 | 2,940 | + |
| | 1.5 | <50 | 3,390 | + |
| S-2308 | 0.0 | <50 | 5,760 | ± |
| | 0.1 | <50 | 4,580 | + |
| | 0.2 | <50 | 5,080 | + |
| | 0.5 | <50 | 5,440 | + |
| | 1.5 | <50 | 6,080 | + |

[1] Silver nitrate test as per Example 3.
[2] The chlortetracycline assay method is not sensitive to less than 50 mcg./ml. However, the cultures showed no chlortetracycline by paper strip chromatography.

EXAMPLE 6

Response of tetracycline-producing starins to ultraviolet light

The novel mutant strains of the present invention may be readily differentiated from previously known chlortetracycline-producing strains of S. aureofaciens (as well as from established strains producing primarily other known tetracyclines such as 6-dimethyltetracycline, 7-chloro-6-dimethyltetracycline, and 7-chloro-5a(11a)-dehydrotetracycline) by comparison of the fluorescence produced under ultraviolet light of longer wave length, primarily at 3660 A. A medium which lends itself particularly well to growth and fluorescence observations is $Q_8$ sporulation agar, prepared as follows:

| | | |
|---|---|---|
| $MgSO_4 \cdot 7H_2O$ | grams | 0.25 |
| $KH_2PO_4$ | do | 0.4 |
| $(NH_4)_2HPO_4$ | do | 0.4 |
| Sucrose | do | 15 |
| Staley's Nutrient #22 | do | 9 |
| Crude agar | do | 30 |
| Tap water, q.s | ml | 1000 |

The pH of this medium was adjusted to 6.6 by means of a 50% solution of potassium hydroxide, then 17.5-ml. aliquots of the medium were dispensed into 25 x 150 mm. glass culture tubes and the tubes closed with cotton plugs. The culture tubes containing the medium were sterilized at 120° C. for 20 minutes, allowed to solidify in slanted position to provide maximum surface area, and refrigerated until needed. Spores of S. aureofaciens strain A–377 were washed from an agar slant with sterile distilled water to form a suspension containing 60–80×$10^6$ spores/ml. A 0.1 ml. portion of this suspension was used to inoculate a portion of the $Q_8$ sporulation agar slants. After inoculation, the $Q_8$ agar slants were incubated at 26.5°–27.5° C. Sporulation was generally complete after 14 days. The same procedure was followed in the case of all the other microorganisms tested which are listed in Table III below.

When observed under ultraviolet light (3660 A.) during the 0–4 days' incubation period, vegatative growth of tetracycline-producing strains became brilliant golden-orange while the butt became increasingly brilliant orange-yellow to yellow. During this phase of growth, chlortetracycline-producing strains may also exhibit a slight amount of fluorescence of a similar type. Simultaneously, the upper portion of the agar slant, where the medium thickness is minimal, fluoresces green-yellow for tetracycline-producing strains and golden-yellow for chlortetracycline-producing strains. Further, as the slants mature, the tetracycline-producing strains retain the yellow fluorescent response in the agar butt to ultraviolet light at 3660 A. whereas the chlortetracycline-producing strains become pale blue.

A fermentation medium for tetracycline production was prepared according to the following formulation:

| | | |
|---|---|---|
| $(NH_4)_2SO_4$ | grams | 5.58 |
| $CaCO_3$ | do | 7–10 |
| $NH_4Cl$ | do | 1.66 |
| $MnSO_4$ (70% tech. grade) | do | 0.08 |
| Cornsteep liquor | do | 20–30 |
| Starch | do | 47.5 |
| Corn flour | do | 14.5 |
| Lard oil | ml | 20–32 |
| Tap water, q.s | ml | 1000 |

The fermentation procedures were carried out according to the directions given in Example 4, using the microorganisms listed in Table III below, with the results set forth in Table III below.

TABLE III

| S. aureofaciens Stain No. | Assays | | $Q_8$ agar slant fluorescence at 3660 A. |
|---|---|---|---|
| | Chlortetracycline mcg./ml. | Tetracycline mcg./ml. | |
| A–377 | 50 | 0 | Pale blue. |
| T–135 | [1] <50 | 620 | Brilliant yellow. |
| T–140 | <50 | 730 | Do. |
| T–143 | <50 | 5,670 | Do. |
| T–225 | <50 | 4,140 | Do. |
| S–2308 | <50 | 6,640 | Do. |
| S–2589 | <50 | 8,770 | Do. |

[1] The chlortetracyline assay method is not sensitive to less than 50 mcg./ml. However, the cultures showed no chlortetracycline by paper strip chromatography.

EXAMPLE 7

Characterization of tetracycline-producing strains of S. aureofaciens by spectrophotometric reflectance of the whole harvest mashes in cornsteep medium Spores of S. aureofaciens strain T–135 were washed from an agar slant with sterile distilled water to form a suspension of containing 60–80×$16^6$ spores/mol. A 0.33 ml. portion of this suspension was used to inoculate an eight-inch shaker tube containing 8 ml. of a medium prepared according to the formulation disclosed in Example 1. Subsequent preparation of inocula of the novel mutant strains of S. aureofaciens employed followed the method of Example 1.

A fermentation medium of the following composition was prepared:

| | | |
|---|---|---|
| $(NH_4)_2SO_4$ | grams | 5.5–7.0 |
| $CaCO_3$ | do | 7–10 |
| $NH_4Cl$ | do | 1.5–2.0 |
| $MnSO_4$ (70% tech. grade) | do | 0.08–0.15 |
| Cornsteep liquor | do | 20–30 |
| Cottonseed meal | do | 0–5 |
| Starch | do | 45–55 |
| Corn flour | do | 14.5 |
| Lard oil | ml | 20–35 |
| Tap water, q.s | ml | 1000 |

After sterilization of this medium in an autoclave for 20 minutes at a pressure of 15 pounds per square inch, 25 ml. aliquots in 250-ml. Erlenmeyer flasks were inoculated with 1.0 ml. portions of the inoculum prepared as described above. The fermentation was carried out at 28° C. from 0 to 18 hours and then at 24° C. from 18 to 142 hours, on a rotary shaker operating at 180 revolutions per minute. The same procedure was followed in the case of the other microorganisms employed which are listed in Table IV below.

Assays for tetracycline were performed according to the standard Hiscox method while chlortetracycline assays were obtained by a fluorimetric technique. The results are set forth in Table IV below. Reflectance curves were obtained for the whole harvest mashes by the use of a General Electric Co. type spectrophotometer, and are reproduced in FIGURES 1 through 6 of the drawings. The samples were run in a one-centimeter glass cell placed in the reflectance position at the back of the sphere; magnesium carbonate was used as the reference. The specular reflectance of the cell was included and a range of 400 mμ to 700mμ was scanned. The values of ΔR at 420 mμ and at 430 mμ were determined and are set forth in table IV below.

TABLE IV

| S. aureofaciens Stain No. | Assays | | ΔR[2] at | |
|---|---|---|---|---|
| | Chlortetracycline, percent by weight | Tetracycline, percent by weight | 420 mμ | 430 mμ |
| T–135 | None [1] | 100 | 27 | 18 |
| T–140 | do.[1] | 100 | 32 | 18 |
| T–143 | do.[1] | 100 | 59 | −9 |
| T–225 | do.[1] | 100 | 72 | 3 |
| S–2308 | do.[1] | 100 | 63 | 12 |
| S–2589 | do.[1] | 100 | 94 | 36 |

[1] The cultures showed no chlortetracycline by paper strip chromatography.

[2] The scales of reflectance and wavelength in Figures 1 through 8 are not linear with the quantities plotted. This is due to the particular plotting mechanism of the spectrophotometer used and in no way effects the calculation of the ΔR values.

EXAMPLE 8

Characterization of a tetracycline-producing strain of S. aureofaciens by spectrophotometric reflectance of the whole harvest mash in synthetic medium Spores of S. aureofaciens strain S–2589 were washed from an agar slant with sterile distilled water to form a suspension containing 60–80×10, spores per ml. A 0.33 ml. portion of this suspension was used to inoculate an eight-inch shaker tube containing 8 ml. of a medium prepared according to the formulation disclosed in Example 1.

A fermentation medium of the following composition was prepared:

| | | |
|---|---|---|
| CaCO | grams | 10.0 |
| $(NH_4)_2SO_4$ | do | 8.0 |
| $NH_4Cl$ | do | 1.5 |

| | | |
|---|---|---|
| Cornstarch | grams | 55.0 |
| $MgCl_2 \cdot 6H_2O$ | do | 2.0 |
| $FeSO_4 \cdot 7H_2O$ | do | 0.06 |
| $ZnSO_4 \cdot 7H_2O$ | do | 0.10 |
| $MnSO_4 \cdot H_2O$ | do | 0.05 |
| $CoCl_2 \cdot 6H_2O$ | do | 0.005 |
| KCl | do | 1.28 |
| $H_3PO_4$ | do | 0.36 |
| L-methionine | do | 0.60 |
| L-histidine | do | 0.80 |
| Distilled $H_2O$, q.s | ml | 1,000 |

To this medium was added a lard oil-mineral oil combination, consisting of 3 parts of lard oil to 1 part of U.S.P. grade mineral oil, at the rate of 0.63 ml. per 25 ml. of medium. After sterilization of this medium in an autoclave for 20 minutes at a pressure of 15 pounds per square inch, 25 ml. aliquots in 250-ml. Erlenmeyer flasks were inoculated with 1.0 ml. portions of the inoculum prepared as described above. The fermentation was carried out at 28° C. from 0 to 18 hours and then at 24° C. from 18 to 142 hours, on a rotary shaker operating at 180 revolutions per minute.

The whole harvest mash assayed 8060 micrograms of tetraycyline per ml. according to the standard Hiscox assay method whereas the culture showed no chlortetracycline by paper strip chromatography. A reflectance curve was obtained for the whole harvest mash by the use of a General Electric Co. type spectrophotometer, and is reproduced in FIGURE 7 of the drawings. The sample was run in a one-centimeter glass cell placed in the reflectance position at the back of the sphere; magnesium carbonate was used as the reference. The specular reflectance of the cell was included and a range of 400 mμ to 700 mμ was scanned. The value of ΔR at 420 mμ was 118 whereas the value of ΔR at 430 mμ was 87.

EXAMPLE 9

Characterization of a tetracycline-producing strain of S. aureofaciens by spectrophotometric reflectance of the whole harvest mash in dried whey medium Spores of S. aureofaciens strain S–2589 were washed from an agar slant with sterile distilled water to form a suspension containing $60–80 \times 10^6$ spores per ml. A 0.33 ml. portion of this suspension was used to inoculate an eight-inch shaker tube containing 8 ml. of a medium prepared according to the formulation disclosed in Example 1.

A fermentation medium of the following composition was prepared:

| | | |
|---|---|---|
| Dried whey | grams | 15.5 |
| Cornflour | do | 42.7 |
| Cornstarch | do | 30.8 |
| $CaCo_3$ | do | 11.5 |
| $(NH_4)_2SO_4$ | do | 8.5 |
| $NH_4Cl$ | do | 2.0 |
| $MnSO_4$ (70% technical grade) | do | 0.140 |
| $CoCl_2 \cdot 6H_2O$ | do | 0.005 |
| Lactic acid | do | 0.650 |
| Tap water, qs | ml | 1,000 |

To this medium was added 0.75 ml. of lard oil per 25 ml. of medium. After sterilization of this medium in an autoclave for 20 minutes at a pressure of 15 pounds per square inch, 25 ml. aliquots in 250-ml. Erlenmeyer flasks were inoculated with 1.0 ml. portions of the inoculum prepared as described above. The fermentation was carried out at 28° C. from 0 to 18 hours and then at 24° C. from 18 to 142 hours, on a rotary shaker operating at 180 revolutions per minute.

The whole harvest mash assayed 6070 micrograms of tetracycline per ml. according to the standard Hiscox assay method whereas the culture showed no chlortetracycline by paper strip chromatography. A reflectance curve was obtained for the whole harvest mash by the use of a General Electric Co. type spectrophotometer, and is reproduced in FIGURE 8 of the drawings. The sample was run in a one-centimeter glass cell placed in the reflectance position at the back of the sphere; magnesium carbonate was used as the reference. The specular reflectance of the cell was included and a range of 400 mμ to 700 mμ was scanned. The value of ΔR at 420 mμ was 129 whereas the value of ΔR at 430 mμ was 66.

This application is a continuation-in-part of our copending application Serial No. 51,974, filed August 25, 1960, now abandoned.

What is claimed is:

1. The process of producing tetracycline which comprises cultivating a strain of Streptomyces aureofaciens which produces tetracycline exclusively under submerged aerobic conditions in an aqueous nutrient medium containing assimilable sources of carbohydrate, nitrogen, and inorganic salts until substantial quantities of tetracycline are produced, said tetracycline-producing strain of Streptomyces aureofaciens being [also] characterized by its ability to impart to the whole harvest mash a color characterized by a reflectance curve, when plotted linearly, wherein the vertical distance between the reflectance curve and a straight line drawn through the reflectance curve intercepts at 400 mμ and 550 mμ is greater at 420 mμ than at 430 mμ [·], *and by the failure of a mature agar slant culture thereof, obtained by the technique described in Example 6, to give a blue fluorescent response to ultraviolet light at 3660 A.*

2. The process of producing tetracycline which comprises cultivating Streptomyces aureofaciens ATCC No. 13908 under submerged aerobic conditions in an aqueous nutrient medium containing assimilable sources of carbohydrate, nitrogen, and inorganic salts until substantial quantities of tetracycline are produced.

3. The process of producing tetracycline which comprises cultivating Streptomyces aureofaciens ATCC No. 13909 under submerged aerobic conditions in an aqueous nutrient medium containing assimilable sources of carbohydrate, nitrogen, and inorganic salts until substantial quantities of tetracycline are produced.

4. The process of producing tetracycline which comprises cultivating Streptomyces aureofaciens ATCC No. 13910 under submerged aerobic conditions in an aqueous nutrient medium containing assimilable sources of carbohydrate, nitrogen, and inorganic salts until substantial quantities of tetracycline are produced.

5. The process of producing tetracycline which comprises cultivating Streptomyces aureofaciens ATCC No. 13911 under submerged aerobic conditions in an aqueous nutrient medium containing assimilable sources of carbohydrate, nitrogen, and inorganic salts until substantial quantities of tetracycline are produced.

References Cited by the Examiner

The following referneces, cited by the Examiner, are of record in the patented file of this patent or the original patent.

UNITED STATES PATENTS 2,866,738 12/58 Minieri et al. ---------- 195—80

FOREIGN PATENTS 787,368 12/57 Great Britain.

A. LOUIS MONACELL, *Primary Examiner.*